(12) United States Patent
Richter et al.

(10) Patent No.: US 7,982,624 B2
(45) Date of Patent: Jul. 19, 2011

(54) SYSTEM AND METHOD FOR ACCIDENT PREVENTION

(75) Inventors: Wolfgang Richter, Germering (DE); Stefan Donat, München (DE); Peter Rosenbeck, Gauting (DE)

(73) Assignee: Ident Technology AG, Wessling (DE)

( * ) Notice: Subject to any disclaimer, the term of this patent is extended or adjusted under 35 U.S.C. 154(b) by 1131 days.

(21) Appl. No.: 10/522,434

(22) PCT Filed: Feb. 28, 2003

(86) PCT No.: PCT/EP03/02080
§ 371 (c)(1),
(2), (4) Date: Feb. 16, 2006

(87) PCT Pub. No.: WO2004/010387
PCT Pub. Date: Jan. 29, 2004

(65) Prior Publication Data
US 2006/0208577 A1    Sep. 21, 2006

(30) Foreign Application Priority Data
Jul. 19, 2002    (DE) .................................. 102 32 934

(51) Int. Cl.
| G08B 21/00 | (2006.01) |
| G08B 23/00 | (2006.01) |
| G05B 19/00 | (2006.01) |
| G06F 7/00 | (2006.01) |
| G06K 19/00 | (2006.01) |
| G08C 19/00 | (2006.01) |
| H04B 1/00 | (2006.01) |
| H04L 9/14 | (2006.01) |
| H04Q 1/00 | (2006.01) |
| B23Q 5/00 | (2006.01) |

(52) U.S. Cl. ...... 340/626; 340/5.2; 340/573.1; 340/611; 340/614; 173/177

(58) Field of Classification Search .......... 340/5.8–5.82, 340/5.2–5.21, 626, 611, 614, 514–516, 10.5–10.52, 340/3.3–3.31, 5.22, 3.5–3.54; 173/177, 20
See application file for complete search history.

(56) References Cited

U.S. PATENT DOCUMENTS
3,897,058 A * 7/1975 Koch ............................ 473/206
4,643,263 A * 2/1987 Karden ........................ 173/168
4,900,881 A * 2/1990 Fischer ...................... 200/61.85
(Continued)

FOREIGN PATENT DOCUMENTS
CA        2283552        3/2001
(Continued)

*Primary Examiner* — Benjamin C Lee
*Assistant Examiner* — Michael Shannon
(74) *Attorney, Agent, or Firm* — Andrew Wilford

(57) ABSTRACT

A system for preventing accidents in the operation of a monitored apparatus carried by a user has terminal in direct contact with the body of the user and provided with a circuit for continuously or periodically transmitting an authorizing user data signal through the body of the user. A signal receiver assigned on the monitored apparatus or machine has an interface in contact with the user for receiving the signal, a circuit for continuously or periodically testing the received data signal, another circuit for outputting a clearance signal that allows operation of the monitored machine or apparatus after a successful test of the received authorizing user data signal, and yet another circuit for terminating output of the clearance signal following a successful test of the authorizing user data signal when a subsequent test of the data signal fails.

24 Claims, 9 Drawing Sheets

U.S. PATENT DOCUMENTS

| | | | | |
|---|---|---|---|---|
| 5,554,979 | A | * | 9/1996 | Kohar et al. ............. 340/825.72 |
| 5,583,386 | A | * | 12/1996 | Meixner et al. ............... 307/326 |
| 5,914,701 | A | * | 6/1999 | Gersheneld et al. .......... 345/156 |
| 5,960,085 | A | * | 9/1999 | de la Huerga ................ 340/5.61 |
| 6,005,489 | A | | 12/1999 | Siegle ...................... 340/825.69 |
| 6,414,587 | B1 | * | 7/2002 | Fitzgibbon ................... 340/5.22 |
| 6,563,940 | B2 | * | 5/2003 | Recce ........................... 382/120 |
| 6,580,356 | B1 | * | 6/2003 | Alt et al. ......................... 340/5.8 |
| 6,832,987 | B2 | * | 12/2004 | David et al. ................... 600/300 |
| 6,861,944 | B1 | * | 3/2005 | Hoepelman .................... 340/5.1 |
| 2002/0030585 | A1 | | 3/2002 | Doi ............................... 340/5.64 |
| 2002/0196123 | A1 | * | 12/2002 | Diehl et al. .................. 340/5.64 |
| 2003/0184430 | A1 | * | 10/2003 | Kumar ........................... 340/5.2 |

FOREIGN PATENT DOCUMENTS

| | | |
|---|---|---|
| DE | 10037226 | 2/2002 |
| WO | WO-2001005931 | 1/2001 |

* cited by examiner

SYSTEM AND METHOD FOR ACCIDENT PREVENTION

FIELD OF THE INVENTION

The present invention relates generally to the avoidance of accidents in the use of devices. More particularly, the present invention relates to a system, to system components and to a method which enables the danger of accidents in the use of devices to be avoided such that the devices can only be operated by authorized users and, for the sake of completion, only when certain predetermined operating conditions are fulfilled.

BACKGROUND OF THE INVENTION

In order to achieve a state in which devices and systems can only be used by certain, so-called, authorized users, it is known to monitor the authorization of users by the use of coded data. For this purpose, identification systems are employed which prior to an operation of an associated device and system, the user must be prepared to have this coded data reviewed to determine whether the user is authorized to use the device and system. If, the case, the identification system transmits to the device and system data which permits their operation or use or controls the device and system accordingly.

In order to provide coded data for the user in an identification system of this type, it is known to employ a portable storage medium (for example a smart card, a chip card, . . . ) which can be connected by the user with the identification system through suitable interfaces. Furthermore, there are also such wireless communicating data transmitters (radio transmitters) which can exchange data with the identification system over a data transmission path. In addition, identification systems are used in which the user himself or herself can input data intrinsic to the user, for example in the form of codes, identifying names, PIN numbers, TAN numbers and the like.

A drawback of these arrangements is that the devices and systems which are to be monitored can be used independently of whether the user is authorized or conditions are present which would militate against such use, after a user transmits coded data which gives an authorization and the device or systems in reply have been freed for such use.

Thus such arrangements are not suitable to so control the use of devices and machines, like for example hand-held devices, machine tools, portable electrical tools, household devices and the like that their operation is only permitted to authorize users and can thereafter be monitored for that purpose.

It is common that the operation will be interrupted and taken up again at a later point in time. This has in the use of known identification systems the consequence that once an operation has been permitted, the operations can then be continued or take up by nonauthorized users or in an impermissible manner.

Even with a control for the later operation, for example after a predetermined time period or after a new monitoring of the authorization of a user is possible but is in solution for various reasons, for example it is impractical to introduce a user code or authorization data from a storage medium each time the operation is to be recommenced after a hiatus.

In addition, inappropriate operations cannot be prevented in this manner when for example required safety steps have not been taken for the operation of the device or machine. Even an operation by an nonauthorized user, for example a child or a worker who may not be correspondingly skilled, cannot be prevented as long as operation has been permitted, for example during the indicated duration within which a use or operations is permitted without renewed monitoring of a user authorization.

OBJECT OF THE INVENTION

It is the object of the present invention to provide a solution in which the use and operation of devices like for example portable tools, machine tools, household devices and the like is permitted for authorized users while persons unauthorized for this use cannot operate them at any point in time.

In addition the present invention should enable the devices to be operated and used only when the predetermined conditions for the operation have been fulfilled, that is for example suitable safety steps have been taken.

THE INVENTIVE SOLUTION

The present invention presents the proposition that data which authorizes a user to use and operate a device will be monitored during the operation of the device substantially continuously or at very short intervals in a manner such that the user is not required to participate in the presentation of the data which has authorized him.

Especially the authorizing data is presented in the framework of a processing or activity which is carried out by the user in servicing or utilizing the device without needing his awareness continuously or discontinuously. With such a service-integrated authorization monitoring, it is no longer required for the user to take special steps to identify himself as the authorized person.

Instead according to the invention, authorization os the user is carried out on the basis of the user's handling of the device and not through an action separate from the servicing or handling of the device. Examples of the handling of the device encompasses holding of a grip or hand piece, the actuation of an on/off switch or sensor or the like of portable and stationary machine tools, for example drills, grinders, machining centers (for example lathes) household devices (for example mixers, electric knives), etc. This enables the monitoring of whether the user of the device is actually utilizing it not only during operation but before start-up. For the user of the device there is no change in his or her manipulation or handling of it.

With devices which require the manipulation by two or more users, the use-integrated identification is carried out based upon corresponding authorization data for the users. An operation by only one user is thus no longer possible.

It is also provided that the operation of a device is only permitted when two or more users are identified one after the other as authorized users. Thus it can be ensured that authorization of one user who is the responsible person for monitoring the operation of the device can be transferred or handed off to a second user who is a person with particular knowledge or ability in the operation of the device. The availability of the device for use by the second person is then only authorized or permitted when both the authorization data for the first user and the auhorization data for the second user are monitored successfully and in succession.

In order to ensure that predetermined conditions for the operation (for example the safety steps) are fulfilled, the authorization data can contain information in addition as to whether the predetermined conditions are fulfilled.

These data are detected in a handling or service-integrated manner and are monitored so that the operation can be almost immediately interrupted as soon as the predetermined operating conditions are no longer fulfilled. If for example the authorization data at least partly requires a protective garment, for example a protective helmet or protective goggles, the device can only be brought into operation and operated when the protective garment is also worn.

BRIEF DESCRIPTION OF THE INVENTION

The solution for the foregoing objects is provided in accordance with the present invention by a system comprising at least one user end device or terminal with an output unit with which the signals which comprise the authorization data are transmitted through the body of the user. To receive these signals, a signal receiver with a corresponding interface is provided. The received signal or the authorization data derived therefrom is checked by a corresponding unit of the signal receiver. If it is determined that the received authorization data is valid, that is actually indicates an authorization for operation of a device, the signal receiver generates an unblocking or clearance signal that permits the operation of the device.

In order to monitor during the operation of the device whether it is indeed being operated or served by an authorized user and/or predetermined safety regulation (for example wearing of a helmet, protective glasses, etc) are fulfilled, the signal receiver will interrupt or terminate the output of the clearance signal when subsequent monitoring of the authorization data indicates a failure. Because of the failure of the clearance signal, the operation of the device cannot continue or progress.

To transmit the signals comprising the authorizing data via the body of the user, it is provided that the user end device or terminal couple this data capacitively and/or inductively into the skin of the user by means of a coupling unit. A direct skin contact with the user terminal is not required in this case. This permits the user terminal to be carried for example in a trouser pocket in order to transmit the authorization data signal through the body.

In addition, it is possible to transmit the signal by means of a contact surface which remains directly in contact with the skin of the user. A comparable direct transmission of the signal to the skin can be achieved by means of a signal output which is connected with a device in contact with the skin (for example an electrode, patches).

Preferably the user terminal or end device has an oscillator for producing the signals encompassing the authorization data whereby it is possible, in addition, by means of a modulator or mixer to modulate these signals at least partly with further data and/or the authorization data.

If desired, the signals of the user terminal or end device, aside from a coding which characterizes the authorization of the user can also comprise control commands for controlling the signal receiver.

The interface unit of the signal receiver can comprise a contact sensitive unit to receive the signals from the user terminal or end device upon contact of the contact sensitive unit with the user. Depending upon the configuration of the contact sensitive unit and the nature of the signals of the user end device or terminal, a direct contact with the body of the user can be required. Further, it is possible to transmit the signals from the is user end device through parts of the clothing of the user which are in contact with the device to the contact-sensitive unit (for example by wearing gloves).

Alternatively or in addition, it is provided that the interface of the signal receiver can comprise an inductive and/or capacitive unit to receive the signals of the user end device or terminal by means of an inductive and/or capacitive coupling. As a result, no direct contact of the user with the inductive and/or capacitive unit is required but it suffices that the user be located at a distance from the inductive and/or capacitive unit which permits an inductive and/or capacitive signal transmission. In this manner it is possible to clear devices for operation when an authorized person is located in the vicinity of the device. Thus, for example, household devices in a kitchen can be used by children when their parent is in the kitchen and can oversee the use of the device, thereby providing an authorized use thereof.

By means of a sound decoder, the signal receiver which detects the authorization data contained in the signal of the user end device or terminal can indicate for example through the use of a comparator whether the user indeed is authorized to utilize the device.

To monitor or check the authorization data signal receiver can comprise one or more storage locations in a memory unit in which data is present for comparison with the received data for authorization. Thus for example the monitoring or test unit of the signal receiver can comprise a corresponding register with at least two data storage locations for monitoring or testing the data serving for authorization.

Advantageously the data used for the testing or monitoring purposes is chosen depending upon the data contained in the signals received from the user end device or terminal. For example the signal receiver can be responsive to commands in the signals of the user end device or terminal to address data for testing the authorization data.

Preferably the user end device or terminal transmits the signals comprising the authorization data continuously or periodically. The signal receiver can in addition be so configured that it tests or monitors the received data for authorization continuously or periodically.

To control the device to be monitored, it is provided that the signal receiver interrupt the energy supplied to the device, whereby the signal receiver is structurally incorporated unitarily in the device and integrated therein or connected with its energy supply.

Preferably at least one user end device or terminal is integrated in protective clothing (for example a protective helmet, safety shoes, protective glasses or goggles, gloves, overalls) or applied thereto. If the protective clothing is not worn by the user, no signals incorporating the authorization data can then be transmitted through the body to the signal receiver. An operation of the device is correspondingly not possible. In order to provide further security that also the user himself or herself is authorized to operate the device, a user end device or terminal is employed which is provided on the body of the user or is worn in his or her clothing. The operation of the device first receives clearance, therefore, from the signal receiver when all authorization data, that is the authorization data from the protective garment and the authorization data from the user worn or carried user end device or terminal receives and tests that data for verification.

In addition, the present invention provides for the use with the system of the invention of user end devices or terminals, signal receivers and protective clothing equipped and programmed for use with a user end device or terminal according to the invention. The present invention relates further to a hand grip or handle device as well as a safety switch arrangement, especially for power tools like electric tools for working with stone, wood or metal.

In the use of power driven tools, there is the problem that safe operation itself requires a substantial holding force under the particular circumstances. Such tools are provided customarily with a first and second grip device so that the tool can be gripped by both hands. The two grips are advantageously so spaced from one another that the hand forces applied at the gripping devices will produce a sufficient bracing torque. Especially with devices which can be manually freely positionable, for example drills, there is a problem that in use under certain circumstances unexpectedly high holding forces may be required which, depending upon the relative position of the tool and the work piece unit can be handled only with difficulty. It is also a problem that the tool under certain circumstances may not be able to be satisfactorily gripped by both hands and especially when the tool may have to have one hand disengaged from one of the grips, the tool may become uncontrolled.

It is also an object of the present invention to provide a solution which can improve the use of such power-driven tools from the viewpoint of work safety technology and/or in view of the tool utilization and guidance.

The present invention proposes a hand grip device which takes into consideration the state of engagement with the grips of the tool and provides a power control of the tool based upon the grip status.

In this manner it is possible in an advantageous way, taking into consideration the grip status of the tool to prevent impermissible tool operating states from arising and to control the tool based upon the grip status. In the case of a drill, it is possible for example in an advantageous manner to match the power supplied itself or the maximum permissible torque to the grip status. In this case it is possible in the event of only one-handed gripping of the drill or in the case where there is only small holding force on the hand grip device to avoid unexpected kickback movements of the drill.

To satisfy this object the present invention provides a hand-grip device that has a hand-grip base body including a hand grip outer surface which has a hand inner surface support segment, whereby in the region of the hand inner surface the support segment at least one pressure-sensitive zone is formed for generating a signal indicating the hand-grip gripping status.

In this manner it is possible, via the force applied to the hand-grip device, through a hand inner surface, to detect the grip status applied by the tool user to generate a corresponding signal. This signal can be generated as an on/off signal and thus can signal whether the force applied to the hand-grip device lies above or below a preferably fixed gripping force threshold.

As an alternative to the output of an output signal which is based upon a threshold value or in combination with this feature, it is also possible to so generate the signal that it indicates different gripping forces at the grip and for example enables a power control proportional to the gripping force.

According to an especially preferred embodiment of the invention, the hand grip device is so configured that in the region of the hand inner surface support segment a plurality of pressure-sensitive zones are formed. This makes it possible, advantageously, to detect actual hand-grip gripping status in a manner enabling it to be classified.

The pressure-sensitive zones are formed, in accordance with an especially preferred embodiment of the invention, as part of a fluid-chamber system. The pressure-sensitive zones can then be formed by an elastically deformable pressure chamber wall. By the loading of this pressure chamber covering it is possible to generate a pressure in the fluid-chamber system which is sufficiently in a singular relationship with the loading of the pressure chamber covering.

In the pressure chamber, according to an especially preferred embodiment of the invention, a liquid, a gel material or optionally a gas filling is provided. Through the filling received in the pressure chamber, a pressure measurement can be carried out by means of a pressure-sensitive measuring element, for example a piezo element or a DMS system.

According to an especially preferred embodiment of the invention, the filling medium received in the pressure chamber cooperates optionally with the intermediary of a pressure line, with a switching device so that the switching device is actuatable based upon the pressurization of the filling medium received in the pressure chamber.

The pressure chamber is so constructed in the region of the hand inner surface support segment and the pattern of the pressure chamber covering that in the region at which the ball of the hand engages it and in the region in which the fingers are applied to it, respective pressure-sensitive zones are formed. As a result, the gripping status can be classified based upon the forces applied by the ball of the hand and the inner surfaces of the fingers.

Thus it is possible in the region of the hand-grip device to provide a multiplicity of pressure-sensitive zones juxtaposed with the individual finger inner surfaces. In this manner it is possible to so generate signals indicative of the hand grip gripping status that contains information as to forces applied by the individual finger inner surfaces.

According to an especially preferred embodiment of the invention, in the region of the hand grip device, a position detection device is provided by means of which the use position or the orientation of the power-operated tool can be detected. With this it is possible, by means of the signal generated by the position detection device to ensure or take into consideration the fact that the tool should only be operated in a defined orientation. It is possible based upon the signal generated by the position detection device to produce an acoustic or optic user feedback.

The aforedescribed hand grip device is provided, in accordance with an especially preferred embodiment of the invention with a hand grip device for an electric drill.

Especially in combination with the aforedescribed feature or also as an alternative thereto, the object of the invention set forth at the outset can also be achieved by a hand grip device with a signal-transmitting unit for launching a signal indicative of the hand grip grip status.

The transmission of the signal indicating the grip status is effected according to an especially preferred embodiment of the invention in that it is coupled into the hand of the tool user. The coupling is effected preferably on the basis of an electrostatic interaction effect. Alternatively thereto—or also in combination with this feature—it is also possible to transmit the signal along electromagnetic or acoustic paths to a receiving unit provided in the region of the tool.

In an advantageous manner, in this case in the region of the hand grip device, a signal modulation unit is provided in the form of an electric circuit in the modulation of the signals emitted on behalf of the signal-transmitting unit, especially the coupling unit.

Through such modulated signals it is possible to transmit a data telegram which for example contains information indicative of the hand grip grip status.

The objects stated at the outset are achieved with the invention also with a power-operated tool that comprises a housing unit, a first hand grip unit and a second hand grip unit, whereby the tool is equipped with a grip status detecting device for detecting a signal indicative of the grip status of the tool. It is possible to form at least one of the two hand-grip units such that, for example, the signal will contain holding-force specific information or finger-pressure specific information. For this purpose it is for example also possible to control the operation or the power based upon the corresponding grip forces applied to the corresponding hand grip unit.

BRIEF DESCRIPTION OF THE FIGURES

Preferred embodiments are described in the present description based upon the accompanying drawing which shows.

DESCRIPTION OF PREFERRED EMBODIMENTS

In the following examples of portable electric hand tools are described as preferred embodiments of the system for accident prevention—whereby after a description of the individual system components, their functions and use will be explained.

Figure 1:
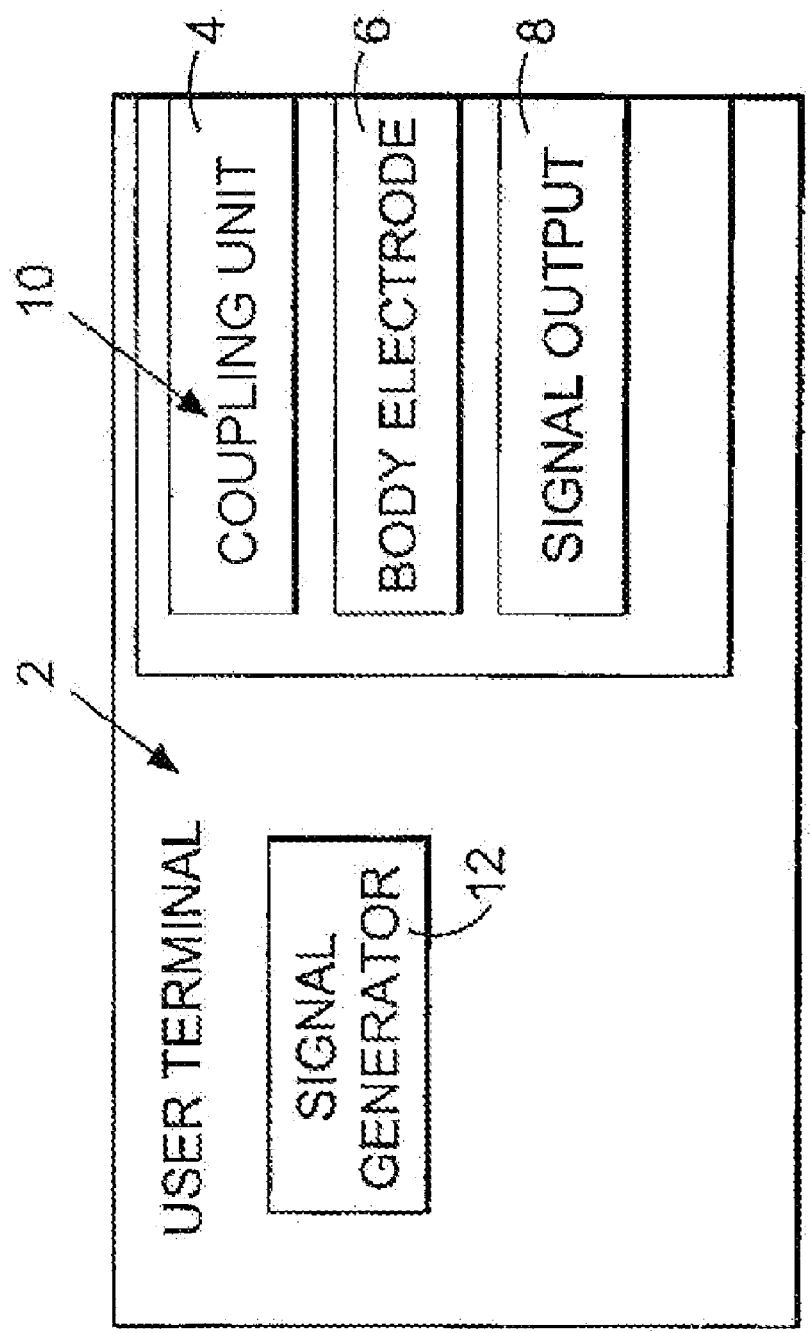
FIG. 1 a schematic illustration of an embodiment of a user end device or terminal according to the invention, FIG. 2 a schematic illustration of a further embodiment of a user end device or terminal, FIG. 3 a schematic illustration of an embodiment of a user end device or terminal as a card, FIG. 4 a schematic illustration of an embodiment of a signal receiver according to the invention, FIG. 5 a schematic illustration of a further embodiment of a signal receiver according to the invention, FIG. 6 a schematic illustration of a signal sequence transmitted by a user end device or terminal according to the invention, and FIG. 7 a schematic illustration of an embodiment of system according to the invention.

As indicated at the outset, data which authorizes a user to begin the operation and the use of an electrical hand tool is transmitted by means of a user end device or terminal over the body of the user to the portable electric hand tool. In FIG. 1 an embodiment of a user end device or terminal 2 has been schematically illustrated.

The authorization data or the use of a portable electric hand tool is transmitted from the user end device or terminal 2, which can also be described as a signal transmitter utilizing signals transmitted through the skin of a user. This can be achieved in that the signals of the user end device or terminal 2 can be applied directly to the skin via a contact location or indirectly coupled to the skin capacitatively and/or inductively. For this purpose a contact location or for capacitative and/or inductive coupling, components serving as a pole can be used, whereby for the other pole, parasitic capacity between the user end device or terminal 2 and the receiver described in the following can he used (for example ground, body, the ground potential of the portable electric hand tool, etc).

With an indirect, capacitative and/or inductive coupling of signals, by means of appropriate couplers, stray fields are produced which feed the signals of the user end device or terminal 2 to the skin.

For transmitting of signals directly through a contact location, the user end device or terminal to itself can directly contact the skin of the user or can be connected with a device (for example electrodes, patches, etc.) directly in contact with the skin.

For the user end device or terminal 2 schematically illustrated in FIG. 1, for the capacitative and/or indicative coupling of signals, a coupling unit 4 is provided for the direct coupling of the signals through a contact location with the skin of the user with a contact region 6 and for the transmission by means of an electrode connected with the body of the user and the like, signal output 8 is provided. The components 4, 6 and 8 of the user end device or terminal 2 have been designated in the following collectively as the output unit 10. By contrast of the illustration of FIG. 1, output unit 10 can comprise individual components or a plurality of each of the components 4, 6 and 8 is determined basically by the nature of the device or machine with which the user end device or terminal 2 is employed and how a user will use the user end device or terminal 2.

When, for example, a portable electrical tool is to be provided with a user end device or terminal 2 which has been formed as a check card or chip card, the output unit 10 of the user end device or terminal 2 need only be equipped with the coupling device 4. In order to use the portable electric hand tool by coupling the authorization data to the skin of the user and, as described in the following to the portable electric hand tool, no direct contact of the user end device or terminal 2 with the skin of the user is required. Rather, by means of the coupling device 4, the required signals for transmitting authorization data to the skin of the user can be coupled to the skin when the user end device or terminal 2 for example when provided in the trouser pocket or shirt pocket.

If the user of a portable electric hand tool, also required for its use to wear a protective helmet, protective glasses or the like, the user end device or terminal 2, for the purposes described can for example be integrated in such protective clothing and can be equipped with an output unit 10 provided with one of the coupling devices and/or a contact region 6.

In order to ensure that the output unit will rest against the skin of the user in a manner required for signal transmission or signal coupling, at least the coupling unit 4 and/or the contact region 6 is so arranged on the protective clothing that, with the protective clothing that, when the protective clothing is put on, a coupling of the authorization data or a direct contact of the contact region 6 with the skin of the user will be ensured. For example, the contact region 6 can be so arranged in a region of the protective glasses that when the protective glasses are put on, a portion of the ear or the bridge of the nose of the use will be contacted thereby. The same applies in the case of a capacitative and/or inductive skin transmission.

To produce the signals to be transmitted via the output unit 10, a signal generator 12 is used which for example can be a voltage-controlled oscillator (VCO). To generate signals reproducing the authorization data, it is provided to drive the signal generator with different frequencies, different frequency durations, different signal intervals and combinations thereof so that the so generated signals have characteristics which will as described in the following serve for testing the auhorization of a user. It is further permissible in this manner to distinguish between different user end devices or terminals 2 by means of he signal generator.

Figure 2:
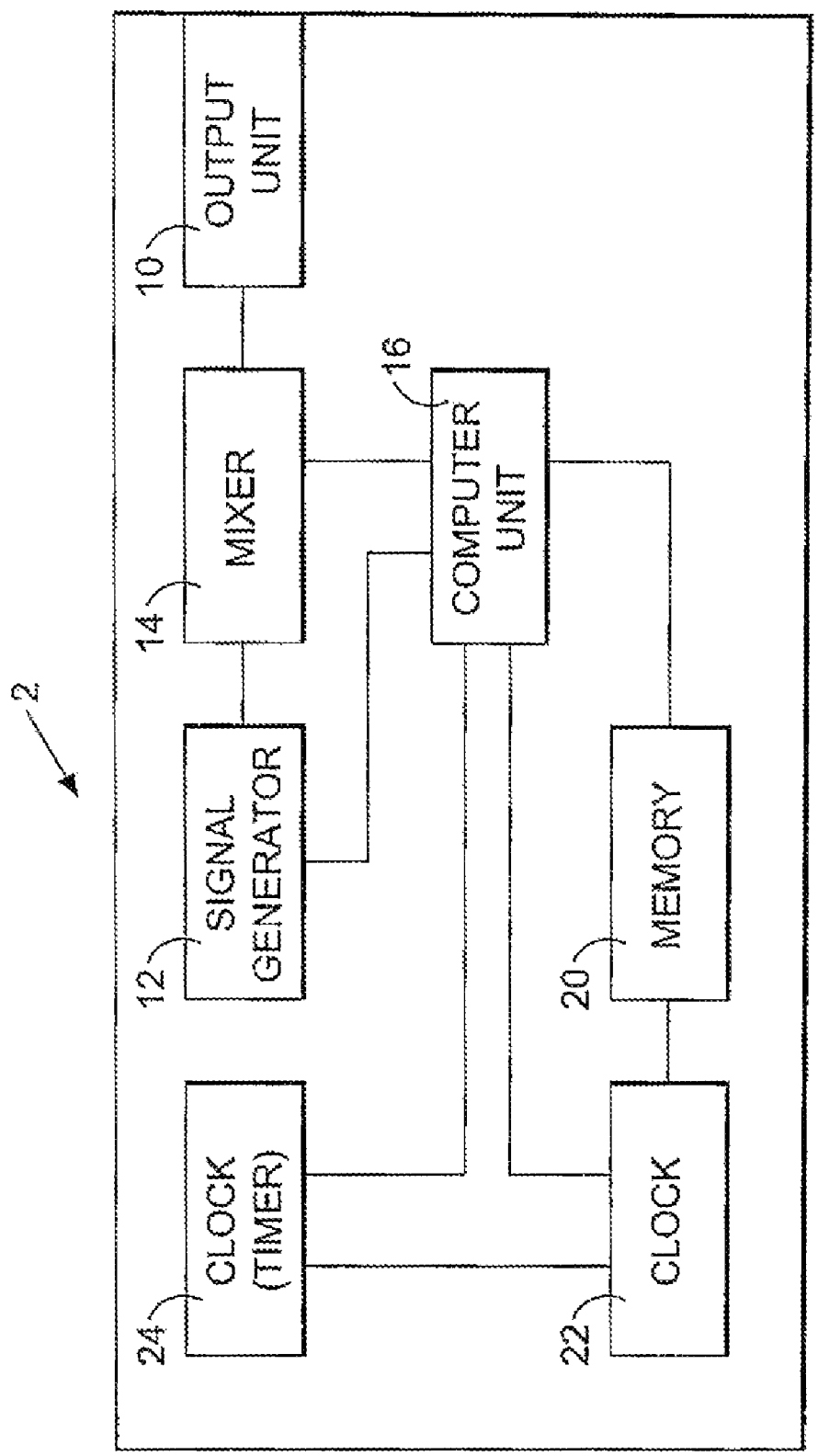

With the embodiment schematically illustrated in FIG. 2 of the user end device or terminal 2, the signals generated by the signal generator 12 can have information impressed thereon by means of amplitude and/or frequency modulation. Apart from a key of such information, it is possible to repetitively modulate the signals of the signal generator 12 when the information, especially with the information at least partly characterizes a user identification code and/or authorization data. It is also possible correspondingly to prepare authorization data using the signal generator signal and onto which modulated information or a combination thereof can be applied.

As can be seen from FIG. 2, the modulation of signals of the signal generator 12 with information uses mixer or modulation 14. To control the signal generator 12 and the modulator 14, a computer unit 16 is provided which serves as a configurator. The configurator 16 can control the signal generator 12 and the modulator 14 or further components as described in the following of the user end device or terminal 2 based upon a predetermined algorithm which is fixed in the configurator 16, for example in a ROM component thereof. To achieve different control sequences with the configurator 16, the configurator 16 can be programmable by means of an input unit 18 and/or by supplying it with corresponding control data which can have been deposited in a memory 20.

If for example authorization data is to be reproduced which contains modulating information in these signals with a predetermined frequency, the configurator 16 will control the signal generator 12 to produce the predetermined signal frequency. To modulate that frequency with information capable of characterizing the authorization data at least in part, the configurator 16 is connected to a memory 20 containing the corresponding data. The data memory 20 is transmitted from he configurator 16 to the modulator 14 together with corresponding control commands for producing signals at the output unit 10 which can be transmitted and which have the predetermined frequency and the modulating information.

A cyclical output of the data from the memory 20 can be achieved for example when the memory 20 is formed as a shift register with a serial output so formed that the data is applied repetitively to the configurator 16. For this purpose a clock or cadence generator 22 is used to control the data of memory 20, for example, bit-wise or byte-wise.

To be able to detect the start of the signal containing the modulating information for the signal generator 12, before the modulation of the data for the memory 20, suitable information (e.g. start bits) of signals are applied for modulation purposes to the signal generator 12. This is especially significant when the data from the memory 20 is provided repetitively as modulating signals for the signal generator 12.

By means of a clock or timer 24, upon transmission of authorizing data and the signals carrying same, a pause or interval is defined after which the next reproduced signal frequency with the authorization data is transmitted. To reduce the power required for the operation of the user end device or terminal 2, during the pause or interval, the user end device or terminal 2 or at least one or more components thereof can be set in a stand-by mode or a slip mode. A further advantage of the use of pauses or intervals between signal frequencies is that, with the use of a plurality of user end units 2, the pause can allow an individual or a plurality of user end devices 2 to transmit their signals in a collision-free manner. Furthermore it is provided that the lengths of the pauses can be randomized to reduce the probability that in the use of a plurality of user-end devices or terminals 2, signal transmission will partly overlap or intersect one another in a time sense.

In order to check whether the user end device has transmitted its signals in an error-free manner or has received them in an error-free manner, the configurator 16 can provide a test sum characterization information by means of which the modulator 14 can modulate the signals of the signal generator 12.

In the following table (Table 1) the components and their functions for the user end device or terminal according to FIG. 2 have been set forth:

TABLE 1

Components and functions of the user end device or terminal

| Component | Requirements | Characteristics |
|---|---|---|
| Signal Generator VCO 12 | Variable carrier frequency | Programmable function generator |
| Memory with serial output 20 | Singular Identification | Shift Register as ring counter |
| Modulator/mixer 14 | Modulation of carrier | analog And-circuit |
| Configurator 16 | Dynamic control | Programmable |
| Burst/sleep timer 24 | Dynamic bursts - powerdown | monostable, variable bursts |
| Clock (cadence gen.) 22 | Shifted ID (one shot, one-by-one) | Start/stop + pulse/pause 1/50 |
| Substrate | Minus to Current supply | Forms capacitative counter pole |

For supplying energy to the user end device or terminal 2, batteries or accumulators can be used, whereby as described previously, by means of the cadence timer 24, distinct operating pacers or intervals can reduce the power consumption and thus increase the overall operating duration. Such energy sources can also be enhanced by solar cells which have not been shown in the Figures or can be provided by such solar cells.

The use of solar cells for the energy supply to the user end device or terminal has further advantages. It is especially advantageous with the use of a device or a machine which is required, for safety reasons, to be used in a workplace of sufficient brightness or at least of minimum brightness value, whereby the energy supply to the user end device or terminal will be carried out with solar cells so configured that the user end device or terminal 2 can only be operated when light in sufficient quantity is available at the workplace. For example, it is possible to use a solar cell for energy supply to the user end device or terminal 2 on the protective glasses or on a protective helmet. When the brightness prevailing in the workplace is too low, the solar cell will not produce the required energy to operate the user end device or terminal 2. To set in operation and use an apparatus or machine, the requisite authorization data can comprise specific person data which allows a user of the user end device or terminal to be singularly identified.

Depending upon which apparatus or machine is to be used with the user end device or terminal 2, the latter can be equipped with attachment needles, key hangers, adhesives or the like. Furthermore the function of the user device or terminal 2 may be provided in other articles or products by integrating its functional components therein. Thus it is possible, for example, by the incorporation of corresponding components and circuitry to integrate the user end device or terminal 2 or its function in safety shoes, protective helmets, safety glasses and comparable articles of clothing to make available the functions of the user end devices or terminals 2 shown in FIGS. 1 and 2. Especially the user end device or terminal 2 can be formed as a press button which can be riveted or otherwise connected to an article of clothing.

Figure 3:
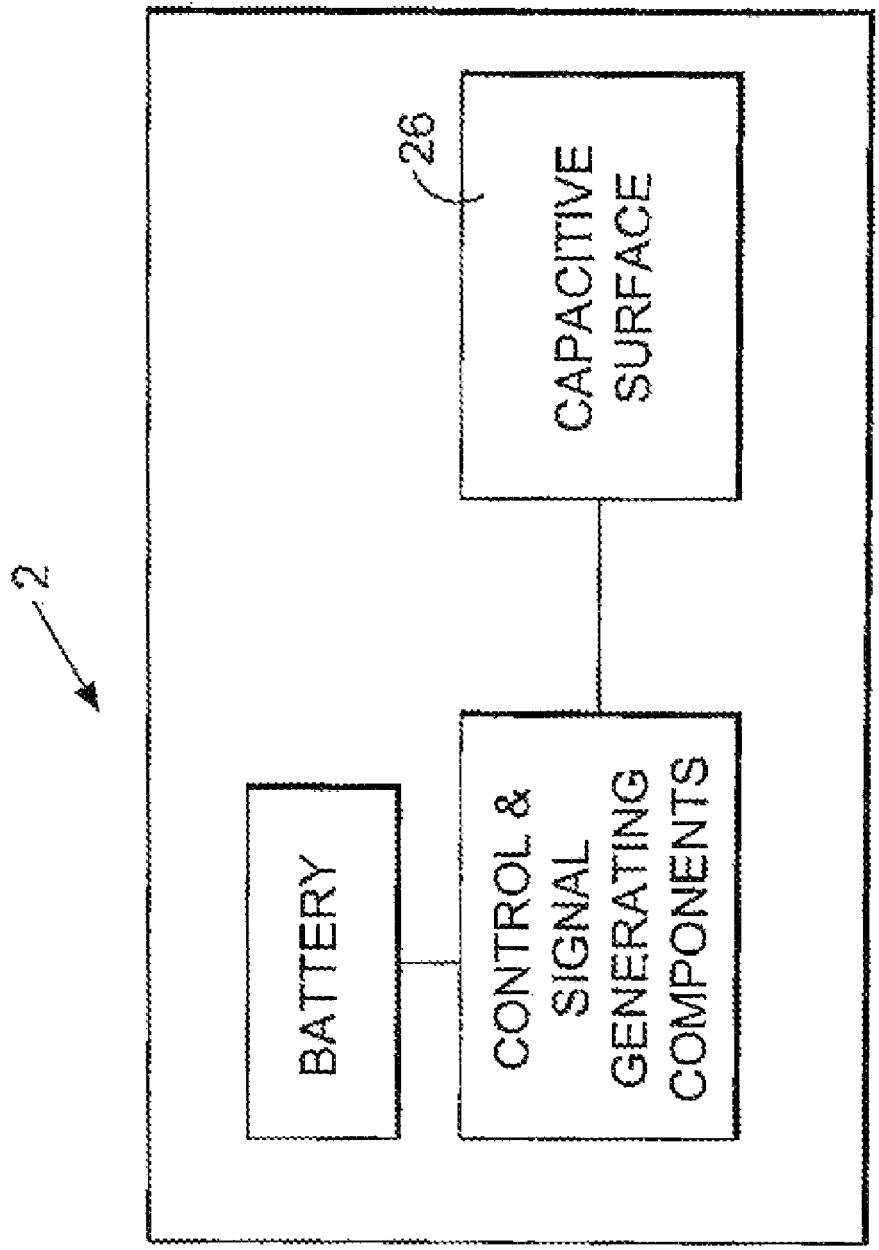

In a further embodiment, the user end device or terminal 2 including its energy source, can be provided in a flat card comparable to a check card or credit card as shown in FIG. 3 schematically, the signal can be coupled into the body of the user by means of a capacitive circuit 26.

To receive the signals transmitted by the user end device or terminal 2, a signal receiver is used. In the embodiment schematically illustrated in FIG. 4, the signal receiver 28 and, to receive signals from the user end device or terminal, of interface unit 30.

As described at the outset, the interface unit 30 of the signal receiver comprises a contact-sensitive unit (not shown) and/or an inductive and/or capacitive unit which can receive the signals from the user end device or terminal 2 by contact with the contact-sensitive unit of the user or by means of inductive or capacitive coupling.

In addition, the signal receiver 28 comprises an active high amplification band pass 32 for spacing noise signals, for example especially ripple voltage (or hum). This is optionally connected with an operational amplifier 34 in order to amplify the signals of the band pass 32. The signals of the band pass 32 or the operational amplifier 34 is supplied to a sound decoder 36. The sound decoder 36 can have a predetermined evaluation frequency which can be adjustable by an RC network in order to detect the existence and duration of corresponding signals to those transmitted by the user end device or terminal 2. The sound decoder 36 can also be used with a ramp generator 38 which can detect the frequencies present in the signals passed by the band pass 32 or the operational amplifier 34. In combination with the sound decoder 36, it is additionally possible to detect frequencies present in the signals transmitted by the user end device or terminal 2.

With the use of the sound decoder 36, without the ramp generator 38, it is possible to produce by means of the signal receiver 28, signals which serve to switch on and switch off an apparatus or machine. With a combination of the sound decoder 36 and the ramp generator 38, the signals from the band pass 32 or the operational amplifier, with the respective information can be delivered to units not shown, for example microcontrollers to control based upon this information an apparatus or a machine. These units can also be used to control the ramp generator 38.

Signals or information from the sound decoder 36 are evaluated by means of a computer unit 40 to test whether the data transmitted by the user end device or terminal 2 authorizes the use of the apparatus or machine. If this is the case, via the output unit 42 corresponding data and/or signals are passed to the apparatus or machine utilized with the signal receiver 28 to permit its operation. Should the computer unit 40 determine that the received signals do not authorize use of the apparatus or machine or that previously received authorization data is no longer being received, via the output unit 42, the apparatus or machine will be so controlled that its operation cannot be undertaken or so that its operation is interrupted.

Figure 4:
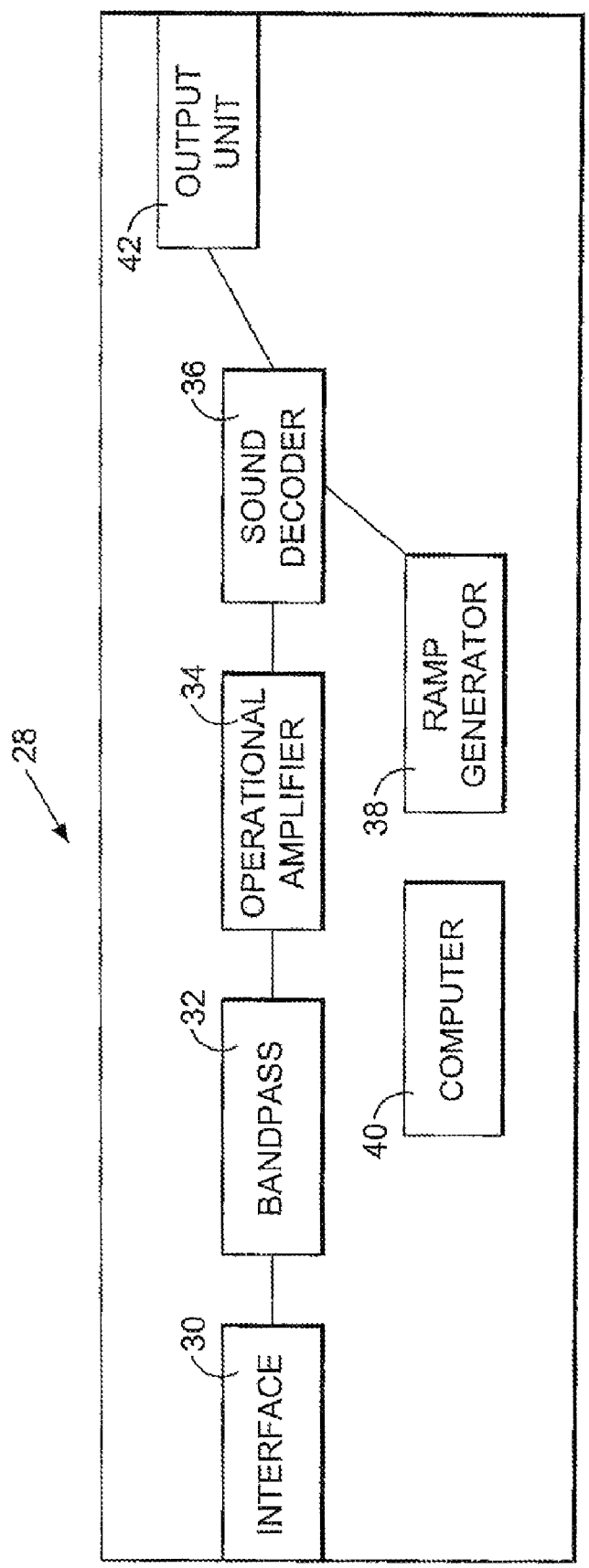
Figure 5:
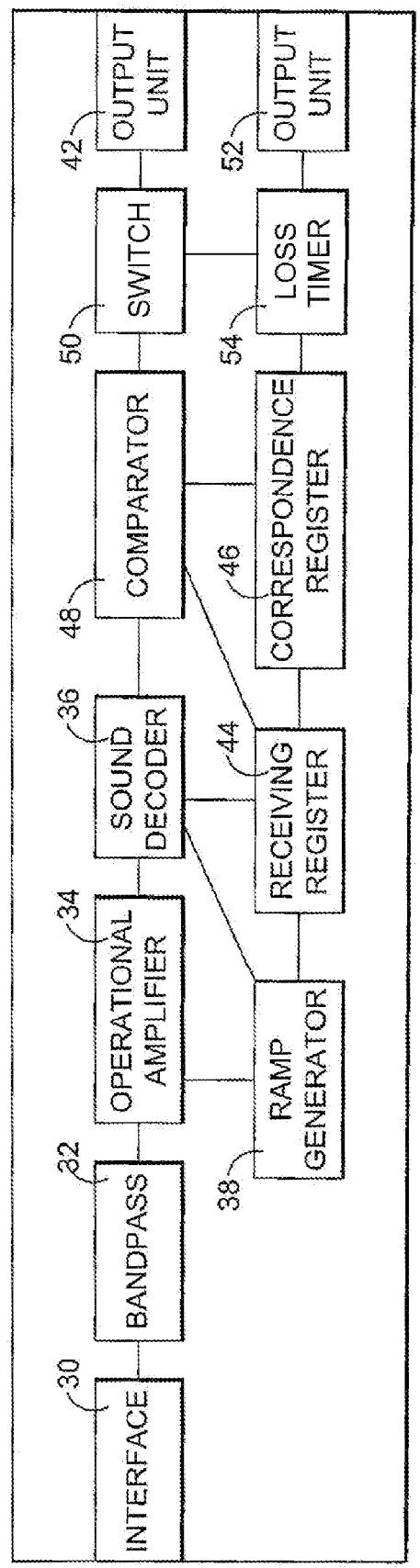

The signal receiver 28 schematically shown in FIG. 5 in another embodiment has, apart from the components indicated in FIG. 4, a receiving register 44 which serves for the central control of the signal receiver 28. The receiving register 44 controls the ramp generator 38 and via the ramp generator, the sound decoder 36 so that the latter can evaluate signals of a predetermined frequency.

The signals received by the signal receiver can contain a start character transmitted by the user end device or terminal 2 or a comparable element of signal information and in that case the receiving buffer (not shown) of the receiving register, for example bit-wise can be filled with the received information and, where provided, can form a test sum. Through the use of test sums, information is only transmitted, as the processing described in the is following of information collected from signal of the user end device or terminal 2, when the test sum determined by the signal receiver matches the test sum provided in the user end device or terminal.

The receiving register 44 controls a correspondence register 46 so that the latter frees up a predetermined memory location for the comparator 48. For this purpose, for example, a 4-bit memory storage location can be used.

The so selected memory location of the correspondence register 46 is used by the comparator 48 to store information in the selected storage location which can be compared with the information recovered from signal of the user device or terminal 2 obtained by the receiving register 44.

The selection of the memory location in the correspondence register 46 can be effected based upon information recovered from signals of the user end device or terminal 2 and/or from the apparatus or machine with which the signal receiver 28 is used. In a simpler configuration instead of a correspondence register 46, a memory is used which contains only one set of authorization data which is compared by the comparator 48 with data extracted from the signals from the user end device or terminal 2.

With manually-operated tools and machines whose operations do not require an electrical current supply, the clearance for operation and the blocking can be effected via a device controlled by the signal receiver 28, but not shown, and which is capable of mechanically blocking or unblocking, for example, movable components of the tool or machine.

If a comparison of the data by the comparator does not show a match, that is the signal from the user end device or terminal 2 do not provide authorization, no data and/or signals will be issued by the signal receiver 28 for controlling the operation of the apparatus or machine. Alternatively it is possible in this case for the signal receiver to output data and/or signals which will block an operation of the apparatus or machine.

Should the comparator 48 detect an agreement between the data recovered from the signals of the end device or terminal 2 with the data of the corresponding register 46 (or the mentioned memory), a switch 50 is so actuated that via the output unit 42 the data and/or information enabling the operation of an apparatus or machine is outputted.

In this case it is provided that the operating clearance data and/or information is outputted as long as the signal receiver 28 receives signals from the user end device or terminal 2, as long as the received signals authorize the operation and as long as the comparator 48 provides an appropriate data test and until an output unit 52 provides a reset signal via the switch 50 or a timer 54 times out on a predetermined time period, the signal being, for example, received by an apparatus or machine.

To test for clearance of operation of the apparatus or machine, whether authorization data is being received from the user end device or terminal, a unit 54 referred to as a loss timer can be used. If within a predetermined period no signals are received from the user end device 2 which corresponds to the data in eh selected memory location of the correspondence register 46, the switch 50 is so actuated that the output of a clearance signal is interrupted or terminated. For initialization of the loss timer, a corresponding signal from the switch 50 can be used.

The above-described components of the signal receiver 28 are described briefly in Table 2:

TABLE 2

Components and functions of the signal receiver

| Component | Purpose | Property |
|---|---|---|
| Amplifier 32, 34 | Amplify the weak input signal | Active bandpass |
| Sound decoder 36 | Code recovery | Hum suppression adjustable |
| Ramper 38 | Set signal amplification and frequency | D/A converter |
| Receiving Register 44 | Instruct components | Automatic serial/parallel conversion |

TABLE 2-continued

Components and functions of the signal receiver

| Component | Purpose | Property |
|---|---|---|
| Comparator 48 | Compare received data with K-register | 24-bit comparator |
| Correspondence register 46 | Contains comparison data | Nonvolatile 16 × 24 bit |
| Switch 50 | Switch output of comparator | Triggers loss timer |
| Loss timer 54 | Short signal on fall-off of code | Post-triggerable |

Apart from the function of the user end device or terminal to transmit signals which identify a user of an apparatus or a machine as an authorized user therefor, the user end device or terminal 2 can launch through the skin of a user further signals which provide or comprise a control code. These signals are converted into the signal receiver into corresponding control commands and the receiving register 44 is thereby controlled.

Figure 6:
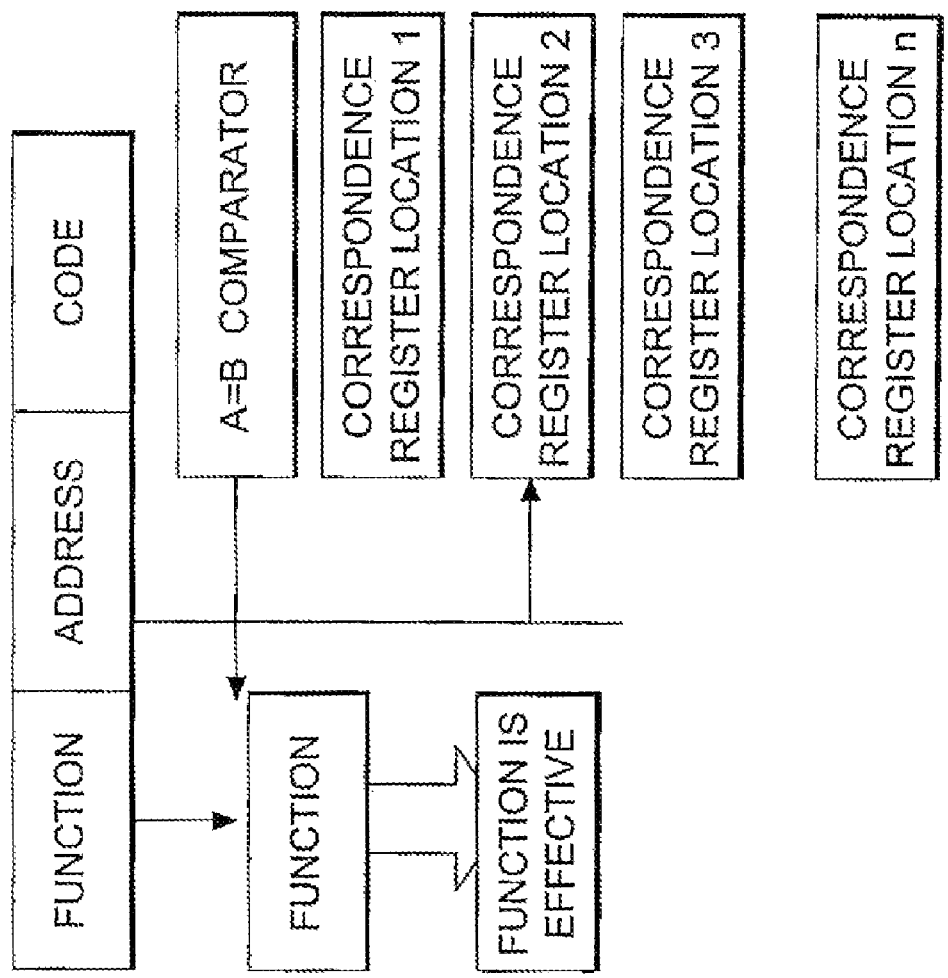

As schematically illustrated in FIG. 6, a signal sequence is which provides the auhorization data, comprises control commands which define the desired function to be carried out by the signal receiver 28 and a memory location of the correspondence register 46, and a code which characterizes a user of the user end device or terminal 2 as an authorized user.

The memory location selected in the correspondence register 46 is defined by an address, such that the comparator 48 can compare the contents of the so-defined memory location of the correspondence register with the code. Should there be agreement between the code and the stored data in the selected memory location of the correspondence register 46, the signal receiver 28 will carry out the defined functions in the received signal from the user end device or terminal 2. Such a control command can, for example, be given upon a definite agreement determined by he comparator 48 to the switch to operate with the required clearance signal, the apparatus or machine.

In addition it is possible in this manner in free memory locations of the correspondence register 46 to store data transmitted by a user end device or terminal 2. If for example the address supplied by a signal transmitted from the user end device or terminal 2 is a memory location of the correspondence register 46 in which no data has yet been stored, using a control code of the user end device 2 or end control of the signal receiver 28, the captured code can be stored. This kind of operation also known as a teaching mode of the signal receiver 28 enables the authorization of further user end devices or terminals 2 to be checked. In addition the signal receiver 28 whose memory (not shown) or correspondence register 46 has no data required for authorization testing, to be programmed.

This sequence and the aforedescribed procedure can be carried out for the authorization of a user also with a plurality of signal receivers 28 which receive signals from a user end device or terminal 2. In this manner a plurality of apparatuses or machines have been at the same time, can be cleared for use by an authorized user. In addition, the test can be effected for example as to whether a user may use a device at a predetermined location, utilizing at least one interface unit 30 assigned to a signal receiver 28 and in contact with or nearby the same. This increases the reliability since the user can only utilize the device when, for example, predetermined service elements are actuated and/or a predetermined body position or engagement of the tool has been established.

It is also possible that a signal receiver 28 will receive authorization data from a multiplicity of user end devices or terminals 2. This allows a check as to whether one or more individuals will have access to a machine and, therefore permits a predetermined number of persons to have such access and to determine whether they are authorized. In order to ensure that the operation of the apparatus is carried out by an authorized person and the safety rules are observed, for example a helmet, is worn, a user end device or terminal is carried by or provided with a user and a user end device or terminal 2 is provided on the helmet. Only when the signal receiver 28 receives authorization data from both user end devices or terminals 2 and checks such data can a clearance be given for operating the apparatus. The invention enables, in the case of a portable electric hand tool that for safety reasons the tool is handled by two hands, for example, in the case of a heavy drill, each of the hand grips of which will have a respective signal receiver or receiving device for a signal receiver assigned thereto so that these are so connected in circuit and programmed that only upon receipt of the signals supplied by the user end devices or terminals 2 at both hand grips is clearance given for tool operation. It is also possible to arrange in a hand grip of a portable electric hand tool a user end device or terminal 2 and in another hand grip a signal receiver 28. Only when the user through his body or also through protective work gloves, engages both hand grips, will operation of the device be cleared.

It is further possible to use the signals transmitted by the user device or terminal 2 for emergency shut off. For this purpose, for example, the signal receiver 28 or an additional signal receiver 28 or a least the component thereof used to receive eh signals from the user end device or terminal 2 can be arranged in a region which upon operation of the device can detect an accident to the operating individual (for example by a rotating tool component, a cutter, the blade or the like). If the dangerous region of the tool comes close to the individual operating the tool or contacts the operator, signals from the user end device or terminal 2 will be received by the signal receiver or the other signal receiver. In response thereto the signal receiver 28 can control the operation of the tool which is used to avoid the danger to the operator in that, for example, the apparatus is shut down. In addition it is possible between authorized service personnel to ensure that the dangerous region of a tool is held in an appropriate position and that will be an emergency shut-off of the apparatus when it comes too close to an individual, especially an unauthorized person in the region of danger.

The use of a plurality of user end devices or terminals 2 in combination with a signal receiver 28 and a plurality of signal receivers 28 in combination with a user end device or terminal 2 end device is explained in conjunction with the following Table 3. Table 3 diagrams how signal sequences from three user end devices or terminals 2 (1), 2 (2), 2 (3) control three signal receivers 28 (1), 28 (2) and 28 (3).

TABLE 3

Control of signal receivers by signal sequences from user end devices.

| User end device | Sequence | 28(1) | Clearance Signal | 28(2) | Clearance Signal | 28(3) |
|---|---|---|---|---|---|---|
| 2(1) | Set 7, ABC | ABC | yes | XYZ | no | DDD |
| 2(2) | Set 8, XYZ | XYZ | yes | PPP | no | XYZ |
| 2(3) | Set 7, ABC | ABC | yes | XYZ | no | DDD |
| 2(1) | Set 7, ABC | ABC | yes | XYZ | no | DDD |
| 2(2) | Set 9, KLM | NNN | no | KLM | no | KLM |
| 2(3) | Set 7, XYZ | ABC | no | XYZ | yes | DDD |
| 2(1) | Set 7, ABC | ABC | yes | XYZ | yes | DDD |

The signal frequencies set out in Table 3 all encompass the control command "set" which can enable an output of the clearance signal upon an agreement at the receiver 28(1), 28(2) and 28(3) with a code with data from a selected storage location of the respective correspondence register 46. The cipher following the control command "SET" gives the memory location in the respective correspondence register 46. The cipher following he control command "SET" gives the memory location in the respective correspondence register 46. The following letters serve to indicate the authorization code from the user end device or terminal 2(1), 2(2) and 2(3).

For example, if the user end device 2(3) transmits the signal frequency "Set 7 ABC", in the signal receivers 28(1), 28(2) and 28(3), the storage location with the cipher 7 in the correspondence register 46 are compared with the code "ABC". Since only the signal receiver 28(1) can provide agreement or a match with that code, only this signal receiver will output a clearance signal. By contrast when the user end device or terminal 2(2) transmits signal frequency with "Set 9, KLM", the signal receivers 28(2) and 28(3) can trigger the clearance signals since their storage location coincides with the number 9 in the correspondence register 46 at which the code "KLM" is present.

Figure 7:
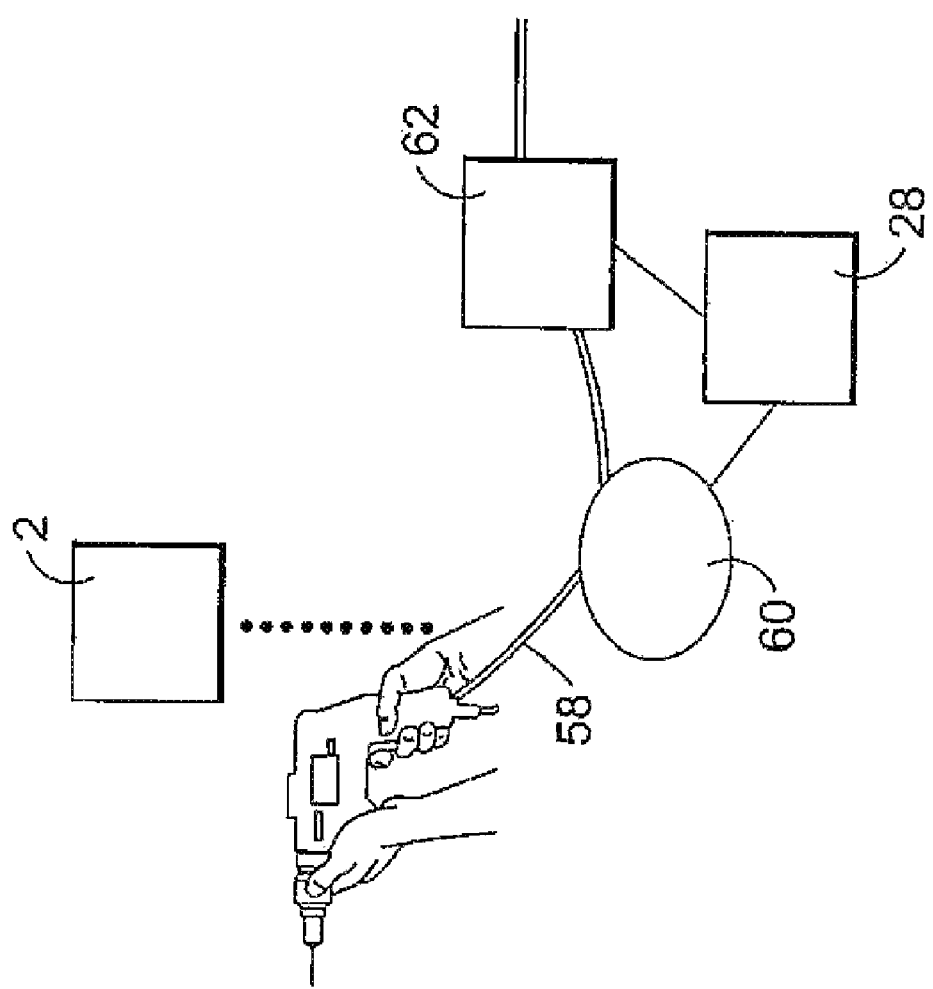

As has been shown diagrammatically in FIG. 7, it is no necessary that a device or apparatus to be controlled be equipped with a signal receiver 28. Rather, it is possible for the authorization data transmitted from a user end device or terminal 2, to be transmitted via an electrical unit 56 (through direct contact or capacitive/inductive coupling) and a net conductor 58 to a signal receiver 28 which for example is inductively coupled by means of a unit 60 with the net conductor. As has been described above, if it is determined that a user is authorized to use the electrical device or apparatus 56, under the control of he signal receiver 28, energy feed to the device or apparatus 56 through the net conductor 58 will be permitted, or example by means of controllable switch 62. This allows, for example, individual or multiple household units in a kitchen to be operated only when they are used by an authorized user (an adult) or the authorized user is a least so close to one of the devices or apparatuses that a transmission of authorization data to the signal receiver 28 is possible. In this manner it can also be ensured that the device or apparatus is used only as requirements mandate. For example the operation of the device or apparatus can be permitted only when a person answerable for monitoring the device operation or a person trusted with the task is at least in the vicinity of the signal receiver 28. If the signal receiver 28 does not receive authorization data from such person or persons, operation of the device or apparatus is not permitted, even in the case that exclusively authorized individuals want to use the device or apparatus.

A further advantage of this mode of operation is that the operation of multiple devices or apparatuses which are supplied by a common energy source can be monitored by means of one signal receiver 28 while all of the devices can be used only by individuals authorized for the purpose. If at least one user is detected who is not authorized to use a device or apparatus, automatically the entire energy supply or all devices or apparatuses will shut down. In a configuration in which the identification itself of an authorized user leads to clearance for energy supply, it is not possible that other devices or apparatuses can be placed in operation by unauthorized users. Furthermore, it is possible in this manner to monitor which devices are operated. When the data transmitted from the user end device or terminal includes data which identifies the user in addition to the authorization data, it is also possible to determine which user is operating which device.

Figure 8:
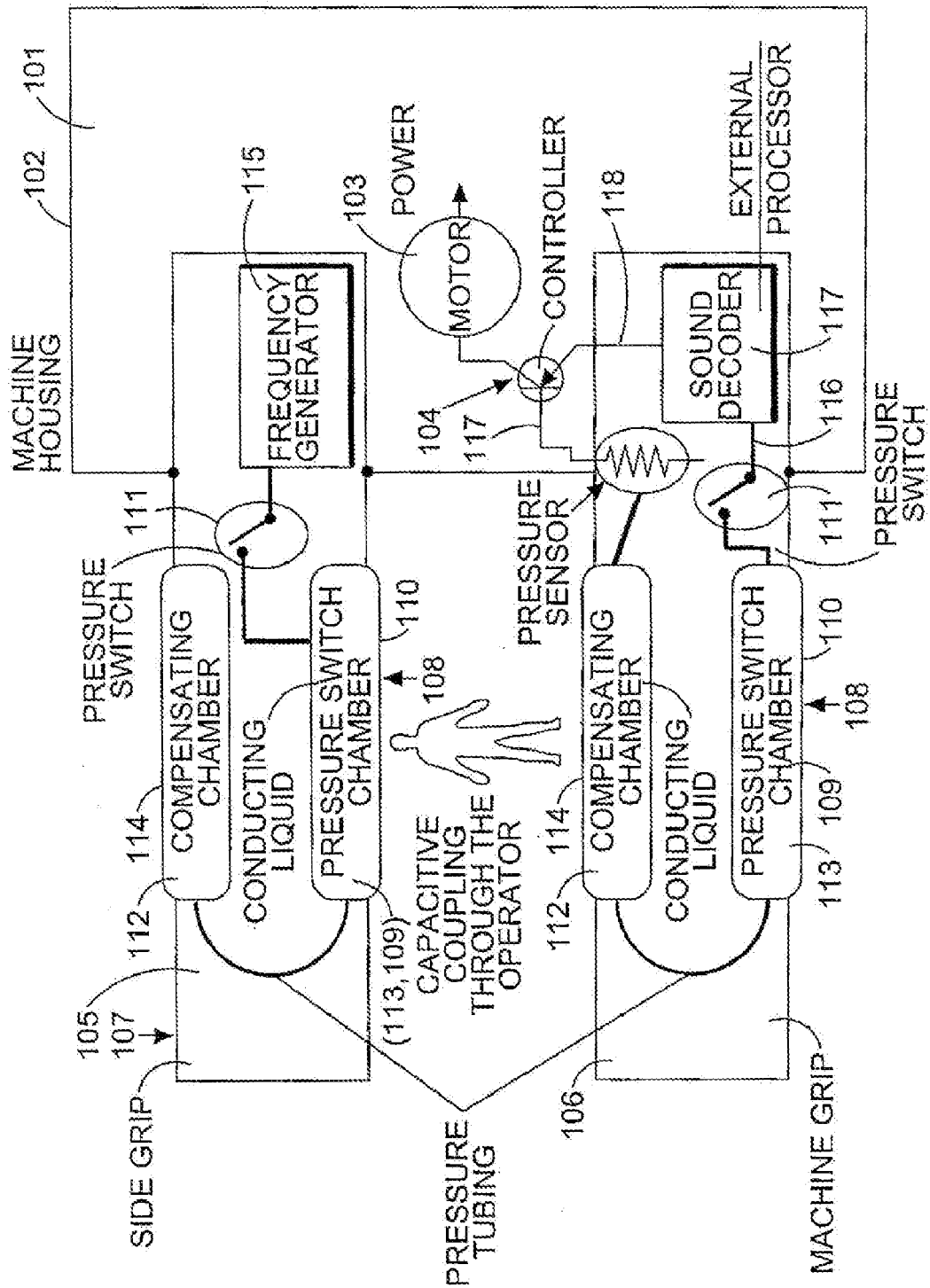
FIG. 8 a schematic illustration of a power tool equipped with a first and second hand grip unit.

In FIG. 8, in the form of a schematic illustration, an electric tool 101 has been shown which comprises a machine housing 102. The electric tool 101 also comprises an electric motor 103 which is operable by a power control unit 104 here schematically shown as a transistor with power control, torque control or speed control.

The electric tool 101 is equipped with a grip unit 105 and a second grip unit 106. The first grip unit 105 can be a lateral grip device which can be selectively removed from the housing 102 in this embodiment. The second grip unit 106 is considered to be a machine grip or handle integrated in the housing 102. The arrangement can be such that, upon removal of the first grip the power spectrum of the electric tool is reduced. (For example no operation at first speed may be permitted, the maximum power being reduced).

The first grip device 105 includes a hand grip outer surface 107 which provides contact with an inner surface of the hand of a user. In the region of the hand inner surface contact segment, a first pressure sensitive zone 108 is formed for generating switching signal indicating the state of gripping by the hand of the user.

This first pressure sensitive zone 108 forms part of a fluid chamber system 109, whereby the pressure sensitive zone 108 comprises an elastically deformable pressure chamber wall 110. The pressure chamber wall 110 is made from an elastomeric material and forms part of the outer surface 107 of the hand grip. The fluid chamber system 109 is filled, in this embodiment, with a semiviscous fluid. The fluid filling of the fluid chamber system 109 communicates with a switching device 111 here formed as an on/off switch. This switching device 111 can assume an on state or an off state depending upon the holding force applied to the grip at the first pressure sensitive zone 108.

The here illustrated fluid chamber system 109 comprises in addition a compensating chamber 112 which communicates with a pressure switching chamber 113 located beneath the pressure sensitive zone 108.

The compensating chamber 112 in this embodiment is so arranged that it is spaced from the pressure switching chamber 113. The compensating chamber 112 is, like the pressure switching chamber, bonded by an elastically formable chamber wall 114. This elastically deformable chamber wall 114 of the compensating chamber 112 extends also in the region of the contact segment of the handle with the inner surface of the hand and as part of the outer surface of the hand grip 107. The arrangement of the two chambers 112, 113 with respect to one another is such that a pressure or force is produced when a certain degree of gripping of the hand grip device 105 both at the chamber wall 114 of the compensating chamber 112 and at the pressure sensitive zone 108 of the pressure switching chamber is achieved by the inner surfaces of the hand. As a result of the formation of this pressure force, the pressure in the region of the fluid chamber system 109 increases and activates, when it exceeds a certain pressure threshold, the switching device 111. The switching device 111 coupled with a signal transmission device 115 to transmit a signal indicating the handgrip gripping state at the first hand grip device 105. In this embodiment, the signal transmission unit 115 comprises a frequency generator for generating a signal sequence, which through coupling units not shown here in greater detail and on the basis of electrostatic exchange effect, is couplable to the hand of the tool user engaging the first gripping device 105.

The voltage supply for the electrical components in the first gripping device 105 can be effected through a power storage device incorporated in the gripping device 105 (for example a battery). Alternatively thereto it is possible, in the region of the electric tool 101, to provide means which enables an energy supply to the electrical components in the vicinity of the first grip device 105 by inductive or electrostatic paths. It is also possible, in the region of the first grip device 105 to provide an energy supply system which provides the requisite electrical energy from externally applied forces acting on the grip device 105. The second grip device 106, which is connected permanently with the machine housing 102 in this embodiment also comprises a pressure switch chamber 113 and a compensating chamber 112. Both chambers 109, 112 are also bounded at least in part by elastically deformable walls 110, 114. It is possible here as well, to generate signals indicating the grip status on the second gripping device 106. The pressure switching chamber 113 of the second grip device 106 also communicates with a switching device 111 which here also is configured as an on/off switch. The signal produced by the switching device 111 assigned to the second grip unit 6 is applied via a switching signal line 116 to a decoder device 117. The decoder device 117 is in a signal connection via a control signal line 118 with the power control unit 104.

The power control 104 is connected via a further input signal line 119 with a pressure sensor 120. The pressure sensor 120 in addition communicates with the fluid chamber system 109 through the compensating chamber 112 and the pressure switching chamber 113.

The pressure sensor 120 and the switch device 111 are so calibrated that an operation of the electric motor 103 can first proceed when a predetermined minimum holding force is exceeded at the second grip 106. In the illustrated embodiment, the switching device 111 is so configured that it, only upon the detected holding force exceeding a minimum holding force, will produce an output signal indicating this state. When this output signal is produced, the decoder device 117 is switched into a switching state which controls the power output of the electric motor 103 through the is power control unit 104.

The control of the power drawn by the electric motor 103 using the power control device 104 as a function of the signal applied to the input signal line 119 is a result. These signals are provided by the pressure sensor 120. The pressure sensor 120 can be so constructed that the power control signals applied to the input line 119 are analog signals.

The function mode with which so a switching arrangement, provided for a drill, operates will be described in conjunction with a process.

In order to carry out a drilling process, initially the drill must be gripped at the machine housing 102 and fitted with a drill bit. Then the drill is gripped by a user of the machine at the first grip device 105 and the second grip device 106. When both grip devices 105, 106 are engaged, the pressure sensitive zone 108 of the two grips are loaded. As a consequence of the loading the pressure sensitive zone 108, the two switching devices 111 are actuated under pressure. The two switching devices 111 are so configured that these first supply an output signal when the force applied to the respective gripping devices 105, 106 exceed minimum holding force and thus signals which are indicative of the reaching at least of these minimum forces. The minimum holding forces can be so chosen that they are reached only when the holding force applied to the two grips 105, 106 exceed the weight of the drill by a predetermined amount.

Should the holding force applied to the first grip 105 exceed this predetermined value, the signal transmission device 115 will be activated through the respective switching device 111. The signal transmission device in this case is in this case connected via a signal coupling unit shown in greater detail, utilizing the capacitive interaction effect, enabling the signal transmission device 115 to produce a signal which is coupled into the hand of the work of the tool user engaging the first grip. The signals coupled into the user are transmitted through the tool user to the second grip 106. In the region of this second grip 106, when the minimum holding force is exceeded as indicated by its switching device 111, a decoder 117 by means to which the signal is supplied through the hand of the tool user engaging the second grip. To the extent that in the region of the decoder 117 is capable of detecting signal inputs with the appropriate criteria, the power control unit 104 is readied to regulate the power as a function of the signal from the pressure sensor 120. The pressure sensor 120 produces a signal which is a function of the holding force with which the user engages the second grip 106. Higher holding forces allow higher power draws of the electric motor 103.

To activate the drill, therefore, the holding force applied to the second grip 106 is increased until the drill operates to rotate the bit at the desired drilling speed.

Correspondingly, during the drilling process the drill speed that is desired is controlled by controlling the grip holding force applied to the second grip 106. The activation of the drill is however only possible when both the first grip 105 and the second grip 106 are properly engaged.

Figure 9A:
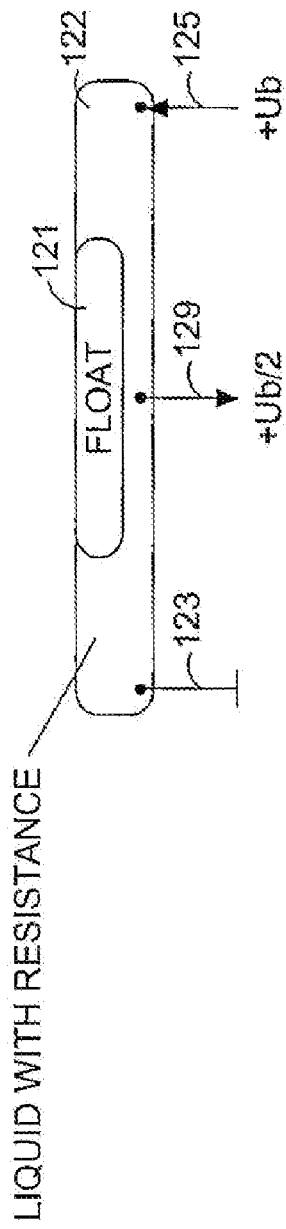
FIG. 9a a schematic illustration to explain the construction of a device for generating a signal indicative of the tool orientation.
Figure 9B:
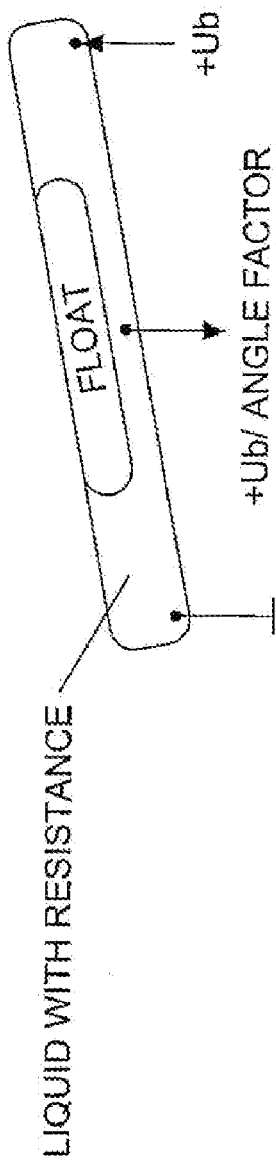
FIG. 9b the device of FIG. 9a in an inclined position.

In FIGS. 9a and 9b, an orientation detecting device has been illustrated which can be integrated especially in the grip units described in connection with FIG. 8.

FIG. 9a shows the orientation detecting device in a horizontal orientation. The orientation detecting device comprises a float 121 in a float chamber 122. The float 121 assumes a position which depends upon the orientation of the float chamber. This float position can be detected by measuring units 123, 124, 125.

In the embodiment illustrated here, based upon the position of the float 121 in the float chamber, signals in the form of potential differences between the measurement conductors 123, 124, 125 can be derived. These potential differences between the measurement conductors 123, 124, 125 can especially be supplied when the float chamber 122 is filled with a conductive liquid and the float forms a constriction body for changing the conductivity cross section within the liquid. The float can be formed as a hollow body. It is also possible, instead of a float, to provide in the chamber 122 only a gas bubble. The pattern or configuration of the wall of the chamber 122 can be so selective that with a certain orientation of the chamber 122, higher angular resolutions are achieved than with other orientations. It is possible to provide the chamber which is utilized to detect the machine orientation, in conjunction or in combination with the chambers 112, 113 already described in connection with FIG. 8. The device illustrated in FIGS. 9a and 9b for detecting the orientation can be so arranged that they support a horizontal or vertical orientation of the drill. Within the grip which can be comprised advantageously of a flexible material, for example, rubber or a silicone rubber, at least one pressure chamber and a compensating chamber connected with the pressure chamber can be provided which is advantageously filled with a conductive liquid (water with an antifreeze additive). The pressure chamber is connected to a pressure switch. Upon a one sided pressure from the exterior on the pressure chamber, the compensating chamber can be filled without actuating the pressure switch only when the compensating chamber also has pressure applied to it from the exterior will the switch be activated. An alternating current voltage with a fixed frequency (for example 300 kHz) can be applied to the conductive liquid in the side grip. In the main grip of the machine, there is an identical arrangement with a pressure switch, but on the latter a sound decoder can be applied which is adjusted to the frequency of the side grip. When an operator engages both grips firmly with the hands and thus switches the pressure switch, the frequency is capacitively transmitted through his skin from the side grip to the sound decoder. This produces a switching state to turn the motor of the machine on until the capacitive alternating current circuit (for example upon release of the grip) is opened. When the output of the alternating current voltage from the side grip is effected at the finger side as well as the region of the ball of the hand and the location at which the ball of the hand rests on the grip, the machine cannot be turned on by winding the grip with adhesive tape. In the hand grip, apart from the pressure switch, a pressure sensor is provided (for example a strain gauge measuring strip) which controls the speed based upon the hand pressure applied and the reaction of the surface to be machined thereto. In addition, with this system one can avoid the effect that the machine will run at high speed after the load has been removed. When for example the drill has broken through a wall or the tool has sawn through a workpiece, the machine drops to low speed because of the absence or reduction in the pressing force. In this manner as well, the invention enables a "soft start" in a simple manner, thereby avoiding strong torque pulses. With an impact drill machine, the liquid damps the impact on the hand bone which permits longer operation without tiring. Finally it is possible to use the liquid to determine the working position of the machine. In that case especially a constriction-float system can be arranged in the side grip.

The invention claimed is:

1. A system for preventing accidents in the operation of a monitored machine or apparatus having first and second hand grips adapted to be grasped by respective hands of a user, the system comprising:
a user end device or terminal in the first hand grip in direct contact with the respective hand of the user with output means for continuously or periodically transmitting an authorizing user data signal through the body of the user, and
a signal receiver assigned to the monitored apparatus or machine and having
interface means in the second hand grip in contact with the respective hand of the user for receiving the authorizing data signal transmitted through the body of the user from the first grip,
means for continuously or periodically testing the received data signal,
means for outputting a clearance signal that allows operation of the monitored machine or apparatus after a successful test of the received authorizing user data signal, and
means for terminating output of the clearance signal following a successful test of the authorizing user data signal when a subsequent test of the data signal fails, whereby the monitored machine or apparatus can only be operated when held by the user with both hand grips.

2. The system according to claim 1 wherein the output means functions inductively or capacitively through the body of the user.

3. The system according to claim 1 in which the output means of the user end device or terminal has a contact region for direct coupling of the authorizing user data signal to the body of the user or a signal output for transmitting the authorizing data signal to a device directly connected with the body of the user.

4. The system according to claim 1 in which the user end device or terminal is equipped and programmed to transmit signals comprising a code giving authorization to the user and control commands for controlling the signal receiver.

5. The system according to claim 1 in which the interface means of the signal receiver comprises contact-sensitive means for receiving the signals from the user end device or terminal upon contact of the contact-sensitive means with the user.

6. The system according to claim 1 in which the interface means of the signal receiver has inductive or capacitive means for receiving the signals of the user end device or terminal by means of inductive or capacitive signal transmission.

7. The system according to claim 1 in which the means of the signal receiver for testing the authorizing data signal comprise a correspondence register with at least two storage or memory locations or data for testing the authorizing data signal.

8. The system according to claim 1 wherein the signal receiver is equipped and programmed depending upon the signal received from the user end device or terminal to access data for testing the authorization data signal.

9. The system according to claim 1 wherein the user end device or terminal is arranged in or on protective clothing.

10. The system of claim 1, wherein the monitored machine or apparatus comprises a household appliance, electric and mechanical tool, or machine tool.

11. The system according to claim 1, wherein the output means is configured so that it effects signal coupling on the basis of electrostatic interaction.

12. The system defined in claim 1, wherein the first hand grip has
a body including a hand grip outer surface engageable by an inner surface of the respective hand of the user and having a segment forming a hand rest for the respective hand inner surface, and
in the region of the respective hand inner surface at least one pressure-sensitive zone for generating a signal indicating the hand grip gripping state and constituting the authorizing data signal.

13. The system of claim 12 wherein the hand grip outer surface has a plurality of the pressure-sensitive zones.

14. The system according to claim 12 wherein the at least one pressure-sensitive zone forms part of a fluid pressure chamber.

15. The system according to claim 14 wherein the at least one pressure-sensitive zone is formed by an elastically deformable pressure chamber wall.

16. The system according to claim 14 wherein the pressure chamber is filled with a liquid, gel or gas.

17. The system according to claim 14 wherein the pressure chamber is coupled with a switch.

18. The system according to claim 14 wherein the pressure chamber is coupled with a pressure-measurement device.

19. The system according to claim 12 wherein the first hand grip has pressure-sensitive zones in the hand rest region and in a finger inner surface rest region.

20. The system according to claim 12 further comprising a plurality of individual finger inner surface pressure-sensitive zones in the region of the first hand grip.

21. The system according to claim 12, further comprising an orientation-detecting device in the region of the first hand grip.

22. The system according to claim 12 wherein the first hand grip is a hand grip of a drill.

23. The system according to claim 12, further comprising a signal-modulating device for modulation of the authorizing data signal.

24. The system according to claim 23, wherein the signal is modulated so that it contains a data telegram.

* * * * *